United States Patent [19]

Broecker et al.

[11] 4,024,095

[45] May 17, 1977

[54] PROCESS FOR THE MANUFACTURE OF HEAT-CURABLE SYNTHETIC RESIN WHICH CAN BE DILUTED WITH WATER AND ARE SUITABLE FOR THE ELECTROPHORETIC COATING PROCESS

[75] Inventors: Bernhard Broecker, Kelkheim; Richard Schardt, Oststeinbek, both of Germany

[73] Assignee: Hoechst Aktiengesellschaft, Frankfurt, Germany

[22] Filed: Jan. 29, 1975

[21] Appl. No.: 544,890

Related U.S. Application Data

[63] Continuation-in-part of Ser. No. 470,264, May 15, 1974, abandoned.

[30] Foreign Application Priority Data

Mar. 9, 1974  Germany .......................... 2411419

[52] U.S. Cl. ..................... 260/23.7 A; 260/23.7 R; 260/862

[51] Int. Cl.$^2$ ........................................ C08K 5/00
[58] Field of Search .......... 260/23.7 A, 862, 23.7 R

[56]  References Cited

UNITED STATES PATENTS

| | | | |
|---|---|---|---|
| 3,558,541 | 1/1971 | Dalton | 260/23.7 A |
| 3,705,866 | 12/1972 | Shibata | 260/23.7 A |
| 3,745,135 | 7/1973 | Pruckmayr | 260/23.7 A |
| 3,767,605 | 10/1973 | Gerlicher | 260/23.7 A |

*Primary Examiner*—Lewis T. Jacobs
*Assistant Examiner*—W. E. Parker
*Attorney, Agent, or Firm*—Gordon W. Hueschen

[57]  ABSTRACT

The subject of the present invention is a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process.

17 Claims, No Drawings

PROCESS FOR THE MANUFACTURE OF HEAT-CURABLE SYNTHETIC RESIN WHICH CAN BE DILUTED WITH WATER AND ARE SUITABLE FOR THE ELECTROPHORETIC COATING PROCESS

CROSS REFERENCE TO RELATED APPLICATIONS

This application is a continuation-in-part of our co-pending application Ser. No. 470,264, filed May 15, 1974, now abandoned.

BACKGROUND OF THE INVENTION

U.S. patent application Ser. No. 450,754 (priority: Switzerland: 1619/74 of Feb. 6, 1974) relates to a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, characterised in that a mixture consisting of:
  a. 35 – 60% by weight of a polybutadiene having an average molecular weight of 750 – 2,000 and an iodine number between 300 and 450,
  b. 10 – 30% by weight of a reactive hydrocarbon resin with a predominantly aliphatic or cycloaliphatic structure having a viscosity between 30 and 800 cP (measured at 20° C in a 70% strength solution in toluene), an iodine number between 160 and 220 (according to ASTM D 555) and an average molecular weight of approx. 400 – 700, consisting of
  $b_1$. 5 – 30% by weight of polyisoprene,
  $b_2$. 30 – 80% by weight of cyclopentadiene and/or dicyclopentadiene and/or alkyl or alkylene derivatives of cyclopentadiene
  $b_3$. 5 – 15% by weight of other singly unsaturated or poly-saturated hydrocarbons with 5 – 12 carbons atoms and with a predominantly aliphatic or cycloaliphatic structure,
  c. 5 – 40% by weight of a fatty acid glyceride ester, wherein the fatty acid radical contains 16 –18 C atoms and the fatty acid glyceride ester has an iodine number between 140 and 220,
is pre-polymerised by heating the 200° – 270° C until the reaction mixture of components (a), (b) and (c), which has an initial viscosity of about 100 – 300 sec (measured according to DIN 4 sec 53,211), displays viscosities between 500 and 2,000 sec (measured according to DIN 4 sec 53,211), the resulting mixture is then reacted with
  d. 15 – 20% by weight of maleic anhydride at 180° to 190° C until no further free maleic anhydride is present and
  e. in the resulting adduct the anhydride groups present are opened by hydrolysis with water or by alcoholysis with the amount of monohydric alcohols with 1 – 4 C atoms required to form the half-ester.

The process of U.S. patent application Ser. No. 450,754 gives heat-curable synthetic resins which can be diluted with water, are suitable for the electrophoretic coating process and are distinguished by very good resistance to salt spray, good throwing powers, good film hardness and low sensitivity of the rinsed but not yet stoved, films to drops of water. However, a continuing disadvantage of the binders described in U.S. patent application Ser. No. 450,754 is that at high deposition potentials, say above 300 volt, the binders tend to excess-coating, that is to say coating thicknesses of 30 μ and above are obtained on the metal sheets to be coated.

An object of the present invention is to provide a process for the manufacture of synthetic resins of this type which when used as binders no longer show this disadvantage and which, for these reasons, are distinguished by even better values of the throwing power and excellent voltge resistance; this means that the breakdown voltage, measured in volt, during electrical deposition is relatively high. The binders manufactured according to the invention should be capable of deposition over a wide voltage range without danger of excess-coating, that is to say in coating thicknesses of 20 – 22 μ.

In the process of the present invention, that is achieved by using, additionally to the components (a) to (d) of U.S. patent application Ser. No. 450,754, a component (f), which consists of an adduct of an α,β-unsaturated aliphatic dicarboxylic acid to a resin acid, it being possible for these adducts to be partially or completely esterified with saturated polyhydric alcohols.

SUMMARY

The subject of the present invention is a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, wherein a mixture consisting of:
  a. 35–60% by weight of polybutadieene having an average molecular weight of 750–2,000 and an iodine number between 300 and 450,
  b. 10 – 30% by weight of a reactive hydrocarbon resin with a predominantly aliphatic or cycloaliphatic structure having a viscosity between 30 and 800 cP (measured at 20° C in 70% strength solution in toluene), an iodine number between 160 and 220 (according to ASTM D 555) and an average molecular weight of aprox. 400 – 700, consisting of:
  $b_1$. 5 – 30% by weight of polyisoprene,
  $b_2$. 30– 80% by weight of cyclopentadiene and/or dicyclopentadiene and/or alkyl or alkylene derivatives of cyclopentadiene,
  $b_3$. 5 – 15% by weight of other singly unsaturated or polyunsaturated hydrocarbons with 5 – 12 carbon atoms and with a predominantly aliphatic or cycloaliphatic structure,
  c. 5–25% by weight of a fatty acid glyceride ester, wherein the fatty acid radical contains 16–18 carbon atoms the fatty acid glyceride ester has an iodine number between 140 and 220,
is pre-polymerised by heating to 200°–270° C until the reaction mixture of components a, b and c, which has an initial viscosity of about 100–350 sec (measured according to DIN 4 sec 53,211), displays viscosities between 500 and 2,000 sec (measured according to DIN 4 sec 53,211), the resulting mixture is then reacted with
  d. 15–20% by weight of maleic anhydride at 180°–190° C until no further free maleic anhydride is present and e. in the resulting adduct the anhydride groups present are opened by hydrolysis with water or by alcoholysis with the amount of monohydric alcohols with 1–4 carbon atoms required to form the half-ester, according to U.S. patent application Ser. No. 450,754 (priority: Switzerland 1619/74 of Feb. 6, 1974), characterised
in that in the reaction carried out to modify the process products, 5 to 25% by weight, relative to the total weight of the components (a), (b), (c) and (d), of adducts of $\alpha,\beta$-unsaturated aliphatic dicarboxylic acids to resin acids and/or adducts which are partially or completely esterified with polyhydric saturated aliphatic alcohols, are co-used as component (f).

The following may be mentioned as examples, to be used individually or as mixtures, of resin acids suitable for the synthesis of the adduct: Abietic acid, laevopimaric acid, neoabietic acid, and palustric acid, as well as partially hydrogenated abietic acid, such as dehydroabietic acid and dihydroabietic acid. However, the resin acids mentioned should still have an iodine number of at least 100.

Mixtures of natural resin acids, such as balsam colophony, pine balsam, root resin, tall resin and similar products, and their partial hydrogenation products, are also very suitable for the manufacture of the adducts.

Suitable $\alpha,\beta$-unsaturated dicarboxylic acids for the manufacture of the adducts are maleic acid, fumaric acid, aconitic acid, citraconic acid and their anhydrides, where they exist; maleic anhydride and fumaric acid are particularly preferred.

The molar ratio of the $\alpha,\beta$-unsaturated dicarboxylic acid to the resin acid in the adduct lies within the limits of 0.2:1 to 1:1.

The polycarboxylic acids obtained by adduct formation between the resin acid and the $\alpha,\beta$-unsaturated dicarboxylic acid or its anhydride can either be in the form of free polycarboxylic acids or they can also be employed partially or completely esterified with polyhydric aliphatic alcohols.

The following may be mentioned as examples of such polyhydric alcohols which are suitable for the esterification of the adducts: Glycerine, trimethylolpropane, pentaerythritol, 1,6-hexanediol and 1,4-butanediol. Pentaerythritol and trimethylolpropane are particularly preferred.

The compounds employed as component (f) should have viscosities between 80 and 250 cP, measured at 50% strength in xylene at 20° C. The melting points of these products should lie in the range from 100° to 160° C. In the preferred embodiment, the viscosities of the component (f) are between 120 and 180 cP, measured 1:1 in xylene at 20° C, and their melting point is between 100° and 130° C.

The component (f) can be added in accordance with different variants. Firstly, according to variant I, the component (f) can be added to the components (a) to (c) according to the process described in U.S. patent application Ser. No. 450,754, and can then be reacted further in accordance with the process of U.S. patent application Ser. No. 450,754.

However, according to variant II, the component (f) can also be reacted according to stage (d) of U.S. patent application Ser. No. 450,754 together with the maleic anhydride.

In these cases, that is to say process variants I or II, the component (f) is preferably employed as the free polycarboxylic acid which is not esterified. In some cases it can also be possible to employ the component (f) in the esterified form, but in each case the increase in viscosity and the compatibility must be tested accurately during the reaction, that is to say the viscosity in stage (c) must not be higher than 2,000 sec (measured according to DIN 4 sec 53,211) and, at least after stage (d), a resin which is very largely clear must have been produced. If these conditions are not fulfilled, the type and amount of the esterified component (f) employed is unsuitable for these process steps.

In a further process variant III, the component (f) can also be added only after the end stage (e) according to the process indicated in U.S. patent application Ser. No. 450,754, in which case the component (f) is then incorporated into the synthetic resin by heating at temperatures between 80° and 150° C.

This process variant III is preferably employed if the component (f) is partially or completely esterified. If a partial ester is used, a reaction temperature range from 80° to 110° C is preferred.

The reaction in process variant III must be continued until a clear resin has been produced. The viscosities of the end products should be between 40 and 170 sec (DIN 4 sec 53,211) measured at 50% strength by weight in ethylene glycol monobutyl ether at 20° C.

In another process variant IV, a part of the component (a) is first pre-polymerised with the component (b) and (c), the remainder of the component (a) is then added to the prepolymer and after completion of stages (d) and (e) the product is reacted with the component (f) whilst heating at temperatures between 80° and 150° C. Finally it is also possible, in a varient V, first to pre-polymerise a part of the component (a) and a part of the component (c) with component (b), then to add further amounts of component (a) and further amounts of component (c) to the pre-polymer and then to react the resin, after completion of stage (d) and (e), with the component (f) whilst warming at 80° to 150° C.

These two process variants IV and V are used preferentially when the proportion of the component (b) in the synthetic resin is to be between 5 and 15% by weight.

In the preferred embodiment of these two process variants (IV + V) the prepolymerisation of the component (b) with parts of the component (a) and (c) is carried out until a viscosity between 1,500 and 3,000 sec (DIN 4 sec 53,211) is reached.

A further embodiment of the process of the present invention is characterised in that the component (b) is employed in amounts of 5 to 15% by weight, based on the weight of the end product.

A further special embodiment of the process of the present invention according to variant I, II and III is characterised in that the component (a) is employed in amounts of 27–50% by weight, the component (b) is employed in amounts of 10–25% by weight, the component (e) is employed in amounts of 12–25 % by weight, the component (d) is employed in amounts of 15–20% by weight and the component (c) is employed in amounts of 5–20% by weight, based on the weight of the end product.

A further special embodiment of the process of the present invention, according to variant IV or V, is characterised in that the component (a) is employed in amounts of 40–55% by weight, the component (b) is employed in amounts of 5–15% by weight, the component (c) is employed in amounts of 3–10% by weight, the component (d) is employed in amounts of 12–18% by weight and the component (f) is employed in amounts of 10–20% by weight, based on the end product.

A further special embodiment of the process of the present invention, according to variant I or II, is characterised in that in each case the component (f) is employed in portions.

In the preferred embodiment, the components (a), (b), (c), (d) and (f) should be present in the following amounts in the end product:

| Binder according to variant I, II and III | |
|---|---|
| Component (a): | 30 – 50% by weight, |
| " (b): | 10 – 30% by weight, |
| " (c): | 10 – 25% by weight, |
| " (d): | 12 – 18% by weight and |
| " (f): | 5 – 25% by weight. |
| Binder according to variant IV and V | |
| Component (a): | 40 – 60% by weight, |
| " (b): | 5 – 15% by weight, |
| " (c): | 5 – 15% by weight, |
| " (d): | 14 – 18% by weight and |
| " (f): | 10 – 20% by weight. |

Hydrocarbon resin I (HRI)

Commercially available hydrocarbon resin based on ethyl or ethylene derivatives or cyclopentadiene, the synthetic resin having a melting point of 100° C and an average molecular weight of 600 and an iodine number of 160. (Escorez ECR-4-100 of Messrs. Esso).

Hydrocarbon resin II (HRII)

Commercially available hydrocarbon resin composed of 36% by weight of cyclopentadiene, 15% by weight of methylcyclopentadiene and 30% by weight of isoprene (Escopol of Messrs. Esso), with an average molecular weight of 600 and an iodine number of 190.

Adduct I of maleic acid and colophony

Commercially available adduct based on colophony/maleic anhydride, having a melting point of 140°–150° C, an acid number of 270–290, a total iodine number of approx. 100 and a viscosity of 100–200 cP, measured at 50% strength in xylene at 20° C. Saponification number: 330 – 350. Commercially available under the name Gramal 525.

Adduct II of fumaric acid and colophony:

Commercially available adduct synthesised from: 81% by weight of colophony, 13% by weight of pentaerythritol and 6% by weight of fumaric acid, having a melting point of 115°–118° C an acid number of less than 20 and a viscosity of 200–300 cP, measured 1:1 in white spirit at 20° C.

EXAMPLE 1

292 g of a polybutadiene having an iodine number of 450 and an average molecular weight of 1,400 are mixed with 23 g of unsaturated solid hydrocarbon resin I, 291 g of unsaturated hydrocarbon resin II, 146 g of linseed oil, 78 g of wood oil and with 47 g of adduct I. The viscosity of the mixture is 300 sec. The batch is heated to 245° C under an inert gas until the viscosity according to DIN 4 sec 53,211 is 630 sec. 194 g of maleic anhydride are then added all at once at 160° C and the temperature is kept at between 180° and 190° C until the content of free maleic anhydride is practically zero. 64 g of methanol and 0.5 g of triethylamine are then added at 80° C and the temperature is raised to 100° C for 1 hour. This opens the anhydride groups in the adduct. The synthetic resin is then diluted with ethylene glycol monoethyl ether to a solids content of 70% by weight.

EXAMPLE 2

292 g of a polybutadiene having an iodine number of 450 and an average molecular weight of 1,400 are mixed with 23 g of unsaturated solid hydrocarbon resin I, 219 g of unsaturated hydrocarbon resin II, 146 g of linseen oil and 78 g of wood oil. The viscosity of the mixture is 300 sec. The batch is heated to 245° C under an inert gas until the viscosity according to DIN 4 sec 53,211 is 630 sec. 194 g of maleic anhydride and 47 g of adduct I are then added all at once at 160° C and the temperature is kept at between 180° and 190° C until the content of free maleic anhydric is practically zero. 64 g of methanol and 0.5 g of triethylamine are then added at 80° C and the temperature is raised to 100° C for 1 hour. This opens the anhydride groups in the adduct. The synthetic resin is then diluted with ethylene glycol monoethyl ether to a solids content of 70% by weight.

EXAMPLE 3

292 g of a polybutadiene having an iodine number of 450 and an average molecular weight of 1,400 are mixed with 23 g of unsaturated solid hydrocarbon resin I, 219 g of unsaturated hydrocarbon resin II, 146 g of linseed oil, 78 g of of wood oil and 23.5 g of adduct I. The viscosity of the mixture is 300 sec. The batch is heated to 245° C under an inert gas until the viscosity according to DIN 4 sec 53,211 is 630 sec. 200 g of maleic anhydride and 23.5 g of adduct I are then added all at once at 160° C and the temperature is kept at between 180° and 190° C until the content of free maleic anhydride is practically zero. 64 g of methanol and 0.5 g of triethylamine are then added at 80° C and the temperature is raised to 100° C for 1 hour. This opens the anhydride groups in the adduct. The synthetic resin is then diluted with ethylene glycol monoethyl ether to a solids content of 70% by weight.

EXAMPLE 4

450 g of a polybutadiene having an iodine number of 450 and an average molecular weight of 1,400 are mixed with 150 g of unsaturated solid hydrocarbon resin I, 100 g of linseed oil and 100 g of wood oil. The viscosity of the mixture is 300 sec. The batch is heated to 240° C under an inert gas until the viscosity according to DIN 4 sec 53,211 is 600 sec. 200 g of maleic anhydride are then added all at once at 160° C and the temperature is kept at between 180° and 190° C until the content of free maleic anhydride is practically zero. 64 g of methanol and 0.5 g of triethylamine are than added at 80° C and the temperature is raised to 100° C for 1 hour. This opens the anhydride groups in the adduct. 200 g of adduct II are then added and the reaction temperature is raised to 140° C until a clear solution has been produced. The synthetic resin is then diluted with ethyene glycol monoethyl ether to a solids contents of 70% by weight.

EXAMPLE 5

100 g of a polybutadiene having an iodine number of 450 and an average molecular weight of 1,400 are mixed with 100 g of unsaturated hydrocarbon resin 2 and 50 g of linseed oil. The batch is heated to 250°–270° C under an inert gas until the viscosity, according to DIN 4 sec 53,211 is 2,300 sec.

A further 500 g of the polybutadiene, as well as 75 g of linseed oil, are added to this mixture. After mixing, 175 g of maleic anhydride are added at 160° C and the temperature is kept at between 180° and 190° C until the content of free maleic anhydride has fallen practically to zero. 50 g of methanol and 0.5 g of triethylamine are then added at 80° C and the temperature is raised to 100° C for 1 hour to bring about alcoholysis. 200 g of adduct II are added to this synthetic resin and the batch is warmed at 120°–140° C until a clear solution has been produced. The synthetic resin is then diluted with isopropanol to a solids content of 75% by weight.

EXAMPLES 6 – 11

In Examples 6–11, the instructions in Example 1 were followed but the raw materials indicated in Table 1, in the amounts indicated there, were employed.

EXAMPLES 12–15

In Examples 12–15, the instructions in Example 2 were followed but the raw materials indicated in Table 2, in the amounts indicated there, were employed.

The synthetic resins according to Examples 1–3, after neutralisation with ammonia, electrophoretic application in coating thicknesses of 20 – 22μm, and stoving (30 minutes at 180° C) give lacquer films with good corrosion resistance in the salt spray test, whilst the synthetic resins according to Examples 4 and 5 give very good corrosion resistance in the salt spray test.

All the electrophoresis baths are distinguished by excellent throwing power, and no excess-coating occurs even at deposition voltages above 350 volt. Furthermore it is conspicuous that at lower deposition voltages (160–220 V) good values of the throwing paper are also still achieved.

Comparison experiments to demonstrate the technical advance achieved

The following lacquers were compared with one another:
1. Synthetic resin used as binder 1: According to Example 10 of U.S. patent application Ser. No. 450,754;
2. synthetic resin used as binder 2: According to Example 8 of the present invention;
3. synthetic resin used as binder 3: According to Example 14 of the present invention.

The synthetic resins used as binders were pigmented with a mixture of equal parts of titanium dioxide and aluminum silicate and a little carbon black, in the pigment/binder ratio of 0.3:1, and after neutralisation with ammonia were diluted to a solids content of 13% by weight.

The values of the throwing power at various voltages were determined.

|  | Throwing power at 200 V | Throwing power at 300 V | Throwing power at 400 V |
|---|---|---|---|
| Binder 1 | 18/12/1 | 19/16/7 | 23/19/14 |
| Binder 2 | 18/12/8 | 16/15/13 | 21/20/20 |
| Binder 3 | 16/14/7 | 20/17/13 | 21/19/19 |

The throwing powers were measured in accordance with the following method:

A 50 cm long, 5 cm wide steel strip is introduced into a plastic tube of 6 cm diameter which carries a disc-shaped copper cathode at the bottom, in such a way that the distance to the cathode is 2 cm.

The deposition is carried out at various electrical voltages.

The coating thickness at 2, 15 and 45 cm distance from the lower edge is measured.

It can be seen from the table that with the binders of the present invention acceptable throwing powers are achieved even at voltages around 200 volt and that even at high voltages no excess-coating takes place, that is to say the binders can be employed over a wide voltage range and even if the coating time is extended there is no danger of overcoating.

EXAMPLE 16

The procedure in Example 4 is followed but instead of methanol, ethanol is used to open the anhydride groups.

EXAMPLE 17

The procedure in Example 4 is followed but instead of methanol, isopropanol is used to open the anhydride groups.

EXAMPLE 18

The procedure in Example 4 is followed but instead of methanol, n-butanol is used to open the anhydride groups.

EXAMPLE 19

The procedure in Example 4 is followed but instead of methanol, sec.-butanol is used to open the anhydride groups.

EXAMPLE 20

The procedure in Example 4 is followed but instead of methanol, isobutanol is used to open the anhydride groups.

TABLE 1

| Example | a weight % Polybutadiene | b weight % hydrocarbon resin | c weight % oils | f weight % adduct I | d weight % maleic acid anhydride | e anhydride group opened with |
|---|---|---|---|---|---|---|
| f with a, b and c reacted together (containing HRI and HRII) | | | | | | |
| 6 | 27,8 | 20,9 HRII / 2,2 HRI | 13,9 linseed oil / 7,5 wood oil | 9,1 | 18,6 | CH₃OH |
| 7 | 26,0 | 19,5 HRII / 2,1 HRI | 12,9 linseed oil / 6,9 wood oil | 15,3 | 17,3 | CH₃OH |
| 8 | 36,4 | 5,6 HRII / 16,9 HRI | 4,5 linseed oil / 9,3 wood oil | 9,1 | 18,2 | H₂O |
| 9 | 43,5 | — / 10,9 HRI | 18,2 linseed oil | 9,1 | 18,2 | CH₃OH |
| 10 | 42,1 | 8,7 HRII / 8,7 HRI | 15,8 linseed oil | 8,7 | 15,8 | butanol |
| 11 | 45,5 | 7,2 HRII / 5,4 HRI | 16,4 linseed oil | 9,1 | 16,4 | CH₃OH |

| Example | a weight % Poly-butadiene | b weight % hydro-carbon resin | c weight % oils | f weight % adduct I | d weight % maleic acid anhydride | e anhydride group opened with |
|---|---|---|---|---|---|---|
| 12 | 27,8 | 20,9 HRII<br>2,2 HRI | 13,9 linseed oil<br>7,5 wood oil | 9,1 | 18,6 | CH$_3$OH |
| 13 | 26,0 | 19,5 HRII<br>2,1 HRI | 12,9 linseed oil<br>6,9 wood oil | 15,3 | 17,3 | CH$_3$OH |
| 14 | 36,4 | 5,6 HRII<br>16,9 HRI | 4,5 linseed oil<br>9,3 wood oil | 9,1 | 18,2 | H$_2$O |
| 15 | 42.1 | 8,7 HRII<br>8,7 HRI | 15,8 linseed oil | 8,7 | 15,8 | CH$_3$OH |

TABLE 2

We claim:

1. Process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, wherein a mixture consisting of:
   a. 35–60% by weight of a polybutadiene having an average molecular weight of 750–2,000 and an iodine number between 300 and 450,
   b. 10 – 30% by weight of a reactive hydrocarbon resin with a predominantly aliphatic or cycloaliphatic structure having a viscosity between 30 and 800 cP (measured at 20° C in a 70% strength solution in toluene), an iodine number between 160 and 220 (according to ASTM D 555) and an average molecular weight of approx. 400 to 700, consisting of
      b$_1$. 5 – 30% by weight of polyisoprene,
      b$_2$. 30 – 80% by weight of cyclopentadiene and/or dicyclopentadiene and/or alkyl or alkylene derivatives of cyclopentadiene,
      b$_3$. 5 – 15% by weight of other singly unsaturated or polyunsaturated hydrocarbons with 5 to 12 carbon atoms and with a predominantly aliphatic or cycloaliphatic structure,
   c. 5–25% by weight of a fatty acid glyceride ester, wherein the fatty acid radical contains 16–18 C atoms and the fatty acid glyceride ester has an iodine number between 140 and 220, is pre-polymerised by heating to 200°–270° C until the reaction mixture of components(a), (b) and (c), which has an initial viscosity of about 100–350 sec (measured according to DIN 53,211), displays viscosities between 500 and 2,000 sec (measured according to DIN 4 53,211), the resulting mixture is then reacted with
   d. 15–20% by weight of maleic anhydride at 180°–190° C until no further free maleic anhydride is present and
   e. in the resulting adduct the anhydride groups present are opened by hydrolysis with water or by alcoholysis with the amount of monohydric alcohols with 1–4 C atoms required to form the half-ester, characterised in that in the reaction carried out to modify the process products, 5 to 25% by weight, relative to the total weight of the components (a), (b), (c) and (d), of adducts of α,β-unsaturated aliphatic dicarboxylic acids to resin acids and/or adducts which are partially or completely esterified with polyhydric saturated aliphatic alcohols, are co-used as component (f).

2. Process according to claim 1, characterised in that the component (f) is reacted conjointly with the components (a), (b) and (c).

3. Process according to claim 1, characterised in that the component (f) is reacted conjointly with the maleic anhydride.

4. Process according to claim 1, characterised in that the component (f) is reacted, after the hydrolysis or alcoholysis (reaction stage (e)) with the synthetic resin obtained (according to (a), (b), (c), (d) and (e)), by heating to temperatures between 80° and 150° C.

5. Process according to claim 1, characterised in that a part of the component (a) is pre-polymerised with the components (b) and (c), the remaining part of the component (a) is added to the pre-polymer and after completion of reaction ((d) and (e)) the component (f) is added to the synthetic resin obtained and is incorporated thereby heating to temperatures between 80° and 150° C.

6. Process according to claim 1, characterised in that a part of the component (a) and a part of the component (c) is pre-polymerised with the component (b), the remaining part of the component (a) and the remaining part of the component (c) is added to the pre-polymer and after completion of the reaction (d)) and (e)) the component (f) is added to the synthetic resin obtained and is incorporated thereby heating to temperatures between 80° and 150° C.

7. Process according to claim 2, characterised in that the component (f) is employed non-esterified, as the free polycarboxylic acid.

8. Process according to claim 3, characterised in that the component (f) is employed non-esterified, as the free polycarboxylic acid.

9. Process according to claim 4, characterised in that the component (f) is employed esterified.

10. Process according to claim 1, characterised in that natural resin acids or partially hydrogenated resins acids, individually or as mixtures, are employed as resin acids.

11. Process according to claim 10, characterised in that abietic acid is employed as the resin acid.

12. Process according to claim 5, characterised in that the component (b) is employed in amounts of 5 to 15% by weight based on the weight of the end product.

13. Process according to claim 2, characterised in that the component (a) is employed in amounts of 27–50% by weight, the component (b) is employed in amounts of 10–25% by weight, the component (e) is employed in amounts of 12–25% by weight, the component (d) is employed in amounts of 15–20% by weight and the component (c) is employed in amounts of 5–20% by weight, based on the weight of the end product.

14. Process according to claims characterised in that the component (a) is present in amounts of 40–55% by weight, the component (b) is present in amounts of 5–15% by weight, the component (c) is present in amounts of 5–10% by weight, the component (d) is present in amounts of 12–18% by weight and the component (f) is present in amounts of 10–20% by weight, based on the end product.

15. Process according to claim 2, characterised in that the component (f) is used in portions.

16. The composition prepared by the process of claim 1.

17. In a process for preparing a heat-curable coating composition which is useful for an electrophoretic coating process, the improvement which comprises using as a resin binder therein, a water-dilutable synthetic resin which has been manufactured according to claim 1.

* * * * *

UNITED STATES PATENT OFFICE
CERTIFICATE OF CORRECTION

Patent No. 4,024,095      Dated May 17, 1977

Inventor(s) Bernhard Broecker, Richard Schardt

It is certified that error appears in the above-identified patent and that said Letters Patent are hereby corrected as shown below:

Col. 1, Line 67 "rinsed but" should read ---rinsed, but ---; Col. 2, Line 19 "that" should read ---this---' Col. 2, Line 36 "polybutadieene" should read ---polybutadiene--; Col. 4, Line 27 "component" should read ---components---; Col. 6, Line 15 "anhydric" should read ---anhydride---; Col. 6, Line 41 "450 gof a" should read ---450 g of a ---; Col. 10, Line 64 "claims" should read ---claim 4 ---.

Signed and Sealed this

Third Day of January 1978

[SEAL]

Attest:

RUTH C. MASON      LUTRELLE F. PARKER
Attesting Officer      Acting Commissioner of Patents and Trademarks